Sept. 17, 1968 C. C. FRASER 3,401,544
THEFT PROTECTION FOR VEHICLES IN PARKING LOTS
Filed Jan. 30, 1967 2 Sheets-Sheet 1
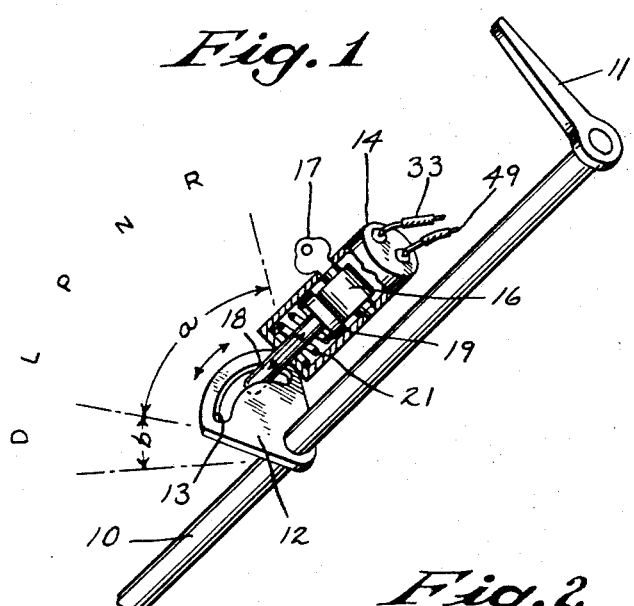
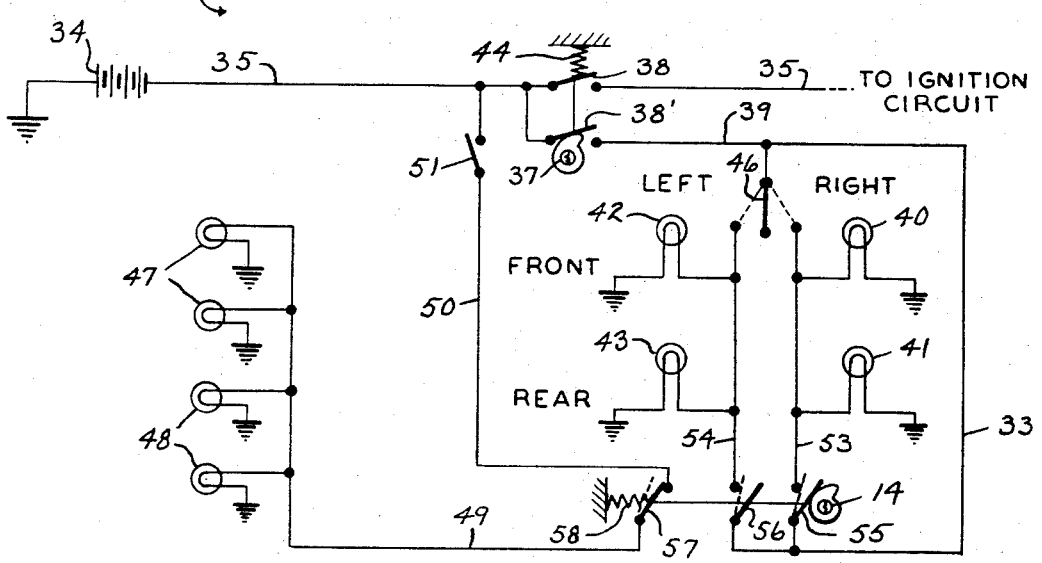
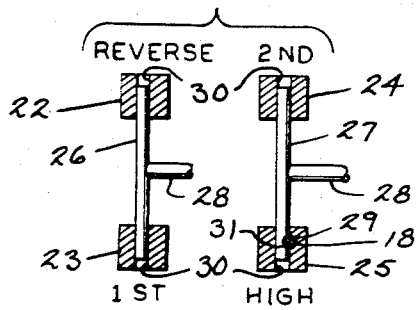
INVENTOR
CYRIL C. FRASER
BY
Morell & Morell
ATTORNEYS

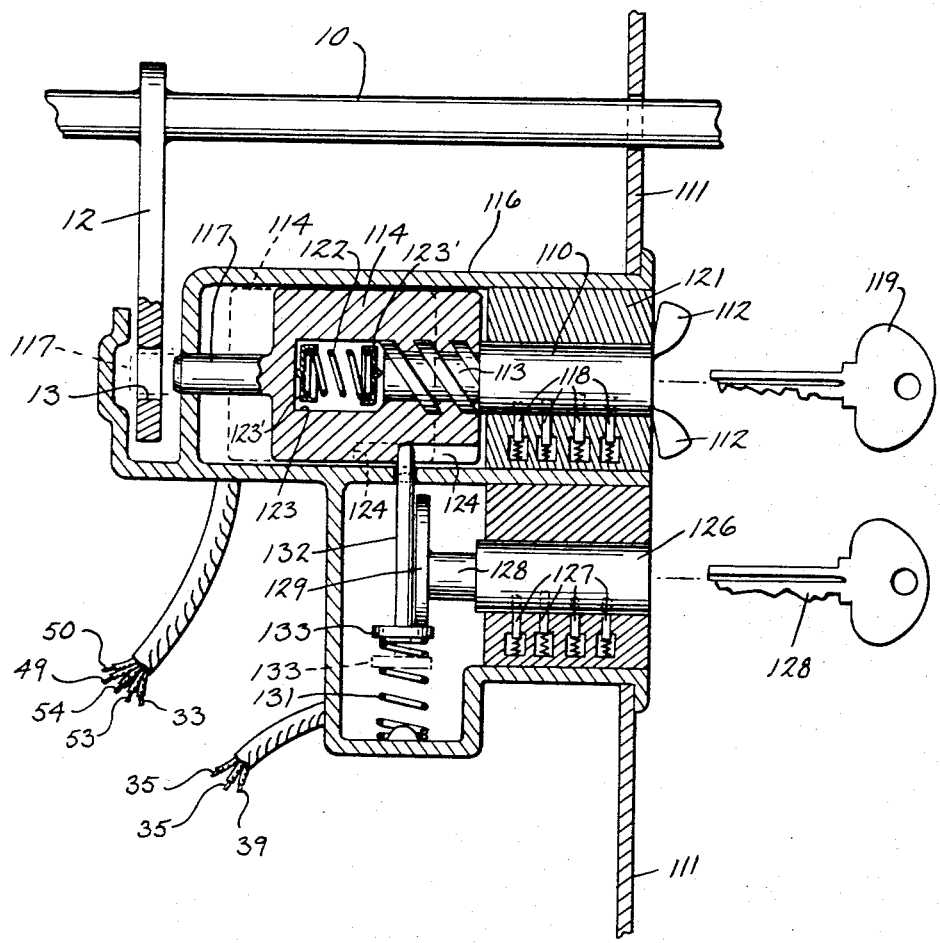

United States Patent Office 3,401,544
Patented Sept. 17, 1968

3,401,544
THEFT PROTECTION FOR VEHICLES
IN PARKING LOTS
Cyril C. Fraser, 12337 NE. Shoreland Drive,
Mequon, Wis. 53092
Filed Jan. 30, 1967, Ser. No. 612,615
10 Claims. (Cl. 70—248)

ABSTRACT OF THE DISCLOSURE

To protect parked cars against theft while allowing parking lot attendants to move the vehicle, a separate lock is provided under control of a key that may be kept by the owner while he leaves the regular ignition key in place. This separate lock allows movement of the gear shift control through a range so worked out that shifting into "low," "neutral," and "reverse" is permitted, but shifting into "high" or "drive" gear is prevented. A connection with the directional signal circuit also causes simultaneous operation of all of the directional signals as an alarm whenever the car is moved, and, in addition, the driving light circuit may be locked out.

BACKGROUND OF THE INVENTION

*Field of the invention*

The present invention pertains to theft protection for automobiles in parking lots, and is of a type which allows those movements of the car which the parking lot attendant requires, but which prevents movement in "high" gear.

*Description of the prior art*

In many parking stations, particularly in large, busy metropolitan areas with limited parking space, drivers are required to leave the keys in the ignition switches of their cars so that the station attendants can move the cars about to allow other cars to enter and leave the lot. This practice makes it relatively easy for an outsider to steal a car from a parking lot, and the increasing incidence of such thefts is a serious problem in our cities.

As far as applicant is aware, there is nothing presently available which is similar to his invention in design or intended function. Prior Patents Nos. 1,050,016 and 2,156,355 disclose means for locking automobile gear shift levers, but said prior devices are designed to prevent all movement of said gear levers and do not permit limited shifting to allow a parking lot attendant or the like to move the car a short distance when necessary, which is a principal feature of the present invention.

SUMMARY OF THE INVENTION

The present invention provides in either a manual or automatic gear shift arrangement, a locking device for cars wherein the gear shift control lever can be locked out of the "high" or so-called "drive" position when the car is left in a parking station with the ignition key therein, but wherein said shift lever can be shifted into "low," "neutral," "park," or "reverse" to enable the station attendant to move the car when necessary, the locking of said gear shift control out of "drive" preventing the car from being operated at normal driving speeds and reducing the likelihood of theft.

In addition to preventing shifting of the gear mechanism into "drive," as described, the novel locking device can also be operatively connected to the car's directional signal lights so that all of said signals will be simultaneously operated when the car is being moved, such flashing signal lights providing an alarm in the event the car is operated on a street or highway by an unauthorized user. Within the scope of the present invention the novel locking device can also be operatively connected to the car's headlight circuit in a manner to prevent the head and tail lights from being turned on by an unauthorized user, thus further minimizing the possibility of theft at night.

A further object is to provide a modified form of the present invention having a "fail safe" feature wherein the lock mechanism is automatically actuated when the ignition is turned "off," without requiring any further action by the driver and eliminating the possibility of the driver forgetting or failing to utilize said lock device.

A further object is to provide a reverse action to the normal lock function whereby the safety device is automatically applied if the lock is forced, drilled or otherwise made inoperable by a thief.

Still further features of the present invention are that the novel lock device is relatively simple in design and construction, it is reliable in operation, and it is otherwise particularly well adapted for its intended purposes.

BRIEF DESCRIPTION OF THE DRAWING

In the drawing, wherein the same reference numerals designate the same or similar parts in all of the views:

FIG. 1 is a perspective view of the locking device installed on the gear shift control lever of a car having an automatic transmission, with a portion of the cylinder of the lock broken away and shown in section;

FIG. 2 is a wiring diagram showing the locking device operatively connected to a car's warning signal and headlight circuits;

FIG. 3 is a fragmentary horizontal sectional view showing the locking device as applied to a manual shift assembly; and FIG. 4 is a vertical sectional view of a modified form of the invention.

DESCRIPTION OF THE PREFERRED EMBODIMENTS

Referring now more particularly to FIG. 1 of the drawing, the numeral 10 designates the rockably mounted gear shift shaft customarily provided on cars having automatic shift mechanisms, as well as on some cars with manual shifts, said shaft ordinarily being mounted alongside the steering column of the car. The numeral 11 designates the hand lever on the upper end of said shaft 10 which is utilized by a driver to rock said shaft when it is desired to shift the gear mechanism. Cars having conventional automatic shift assemblies are provided with a suitable indicator (not shown) designating the various gear positions, and in most cars said shift positions are presently arranged in the following sequence: "park," "neutral," "drive" (one or more), "low," and "reverse," in order. In accordance with the present invention, however, it is essential that the order or sequence of said gear positions be so arranged that the "drive" position, or positions, be located at one end or the other of the range, as will be hereinafter seen.

An example of a gear sequence within the scope of the present invention as shown in FIG. 1 is: "drive" (D), "low" (L), "park" (P), "neutral" (N), and "reverse" (R), although any order wherein the "drive" gear is located at either end of the range is satisfactory. The change of said sequence from the arrangement presently utilized is not a major engineering problem and should not prove difficult for auto manufacturers.

With reference again to FIG. 1 of the drawing, rigidly mounted on and projecting outwardly from the rockable shift control shaft 10 is a sector member 12 provided with an arcuate slot 13 concentric with the axis of said shaft 10, and permitting the shaft to be rocked through the several shift positions L, P, N or R, but excluding the "drive" position. In the drawing, the range of movement through "low," "park," "neutral," and "reverse" is indicated at a, while the arc segment b which is beyond the extent of said slot 13 designates the "high" or "drive" range.

The sector 12 is preferably mounted on the gear shift shaft 10 at a location below the dashboard (not shown) of the car, and rigidly mounted on said dashboard, or suitably supported in any other way, is a cylindrical lock housing 14 having suitable key-actuated mechanism such as a rotatable cam 16 therein, there being a removable key 17, which may be the same key which unlocks the trunk. A reciprocable plunger 18 is carried slidably in and projects downwardly from the lower end of said cylindrical housing 14, in a position to enter the slot 13 in the sector 12 therebelow. Said plunger 18 is provided with an enlarged head 19 immediately adjacent the cam 16, and surrounding said plunger within the housing is a spring 21 which yieldingly urges the plunger toward a retracted position.

When the cam 16 is turned in one direction by means of the key 17 the high side of the cam engages the plunger head 19 and pushes the plunger 18 downwardly against the tension of spring 21 to a position wherein the lower end of said plunger projects into the arcuate slot 13 in the sector 12, as shown in the drawing. Turning movement of said cam 16 in the opposite direction allows said plunger to retract.

In the operation of the locking device illustrated in FIG. 1, when an owner wishes to operate his car in the normal manner the key 17 is in a position to permit the spring-loaded plunger 18 to assume its retracted position, thus permitting operation of the car in the conventional manner, including the use of all of the gear shift positions.

When the driver parks his car in a parking station he may leave the ignition key therein, but in accordance with the form of the present invention shown in FIG. 1 he also turns the special key 17 and removes it, taking it with him when he leaves the car. This causes the cam 16 to force the spring-loaded plunger 18 downwardly to a position wherein it projects into the arcuate slot 13 in the sector 12, as described, so that the gear shift shaft 10 and sector 12 can only be rocked within the range shown at a in FIG. 1. Thus it will be seen that the gear shift lever 11 may be manipulated to rock the shaft 10 through the range for "low," "neutral," "reverse," and "park," but shifting into the range b in FIG. 1 is prevented because of engagement of the right-hand end of the slot 13 with the plunger 18. As hereinabove described, the range b is for "drive."

With the gear shift lever thus locked out of the "drive" range a parking station attendant can operate the car in any of the other gear positions to move the car about, as is required to permit other cars to enter or leave the lot, but the car cannot be driven at normal operating speeds, thereby reducing the likelihood of theft.

While the novel locking device has been hereinabove described in conjunction with a car having automatic transmission, it is to be understood that said device can also be applied to cars having manual gear shifts.

As is shown in FIG. 3 of the drawing, a conventional manual shift assembly has the following shift positions: "reverse" 22, "first" 23, "second" 24, and "third" or "high" 25. Shiftable elements 26 and 27 are slidable in bores 30 therein, and said shiftable elements have shifting yokes connected thereto as at 28, as is well known in the art.

A locking unit as illustrated in FIG. 1 and hereinabove described is provided adjacent the shift assembly, and one of the supporting members 25 for the shifting element controlling "high" is provided with a semi-circular groove 29 communicating with the bore 30. The shiftable element 27 is provided with a similar semi-circular groove 31 which coacts with said groove 29 to form a cyclindrical bore when said shifting element 27 is in its illustrated "neutral" position. When it is desired to lock the shift mechanism the key-actuated cam member 16 (FIG. 1) is turned to urge the plunger 18 downwardly to a position wherein said plunger projects into said coacting grooves 31, 29. Thus shifting movement of the member 27 is prevented, and the manual shift mechanism is locked out of "second" and "high" positions. The result is that the car can be driven in either "reverse" or "low" to permit a parking station attendant to move it short distances when necessary, but it cannot be shifted into "second" or "high," thereby preventing driving at ordinary speeds and minimizing the possibility of theft.

As hereinabove mentioned, in accordance with the complete theft-protection system the above-described locking device can be operatively connected to the directional signal and driving light circuits of a car to further reduce the possibility of theft. The wiring diagram illustrating such connections is shown in FIG. 2 of the drawing.

Referring now more particularly to FIG. 2, the numeral 34 designates the car's storage battery and the lines 35 and 39 connect the same to the igniton and warning signal circuits, respectively, there being a double pole switch including a switch 38 in the ignition circuit and 38' in the circuit which controls the directional signal lights 40, 41, 42 and 43. Suitable spring means 44 is operatively associated with said switches 38, 38'. A key in the ignition lock 37 may be manipulated to open and close said switches, as is well known in the art. Thus, by inserting the ignition key in the switch 37 and turning the same the operator will close the ignition circuit and prepare the warning signal light circuit for use.

As is conventional, when the ignition switch 37 has been turned on the driver can actuate either the right or left warning lights by means of a manual switch 46 which can be shifted from its open, full line position of FIG. 2 to either of the closed positions illustrated in broken lines, depending upon which way the driver intends to turn. The driving headlights 47 and taillights 48 are also operatively connected to the battery 34, and a dashboard switch 51 is ordinarily provided to permit said lights to be energized independently of the ignition switch 37.

In accordance with the illustrated embodiment of the present invention, a triple switch unit including switch elements 55, 56, 57 is provided adjacent and operatively associated with the key-actuated locking device 14 hereinabove described, and switches 55 and 56 are connectible to the battery by line 33. Said switch elements 55 and 56 are closable to connect said line 33 to lines 53, 54 leading to said directional signal lights, but suitable spring means 58 normally maintain said switches 55, 56 in an open condition, thus allowing operation of the direction signals through the manual switch 46 in the ordinary manner.

By means of the key-actuated lock device 14 hereinabove described the switches 55, 56 are shifted to a closed position whenever the plunger 18 is extended, and with said switches closed it will be seen that when the ignition switch 38' is also closed the circuit is completed to both the left and right signal lights regardless of the position of the manual switch 46. The result is that when an owner leaves the ignition key in his car and turns and removes the key from the locking unit 14, the turning of said ignition key to start the car will cause all of the flashing directional signals to operate simultaneously. This will not ordinarily attract undue attention in a parking lot when an attendant is merely shifting the car from one location to another, but if the car is driven on a street or highway by an unauthorized user said flashing lights will provide an unmistakable alarm.

As hereinabove mentioned, in addition to the connection of the locking device 14 in a car's direction signal circuit, the headlights 47 and taillights 48 can also be operatively connected therewith. As shown in FIG. 2, the switch unit including the direction signal switches 55, 56 includes a third switch element 57 which is normally maintained in a closed postion by the spring means 58. When said switch 57 is closed, and when the conventional dashboard light switch 51 is closed, a complete circuit is provided between said head and taillights and the power source 34 through lines 35, 50 and 49, thus allowing the operation of said lights. When the locking unit 14 is turned and the key removed, however, as when an owner leaves his car in a parking lot, the switch 57 is open and the circuit broken, thereby making it impossible to use said driving lights and further reducing the likelihood of theft at night.

Referring now to FIG. 4 of the drawings, illustrated therein is a modified form of the present invention which is designed to automatically lock the gear shift control out of "drive" or "high" when the ignition key is turned to the "off" position without requiring any further action on the part of the operator, said device being unlocked by means of another key removably insertable in an adjacent, coacting lock. With the form of the present invention shown in FIGS. 1–3 it is possible for an owner to forget to lock the shift control out of "drive" when he parks, or, human nature being what it is, he might be unwilling to expend even the minimal extra effort required. With the modified locking device hereinafter described, however, an owner cannot fail to lock his car out of "drive" when he turns the ignition off. The device illustrated in FIG. 4 is "fail safe" in this respect.

As appears in FIG. 4, said modified locking unit is mounted in the instrument panel 111 adjacent the gear shift control shaft 10, and includes a rotatable core 110 preferably having external grip means 112 thereon, the function of which will be hereinafter seen. Conventional spring-loaded lock tumbler elements 118 are provided in the surrounding housing 121 to prevent undesired rotation of said core 110, and a key 119 is adapted to engage and depress said tumbler elements when it is intended to rotate said lock, as is well known in the art.

Formed on and extending coaxially rearwardly from said rotatable lock core 110 is a coarse screw or cam extension 113 which engages within a matching threaded cylinder 114 rotatably and axially movably carried in the lock housing 116. A coaxial plunger 117 is formed on and projects rearwardly from said cylinder 114, and formed in the surface of said cylinder is a longitudinal cutout or groove 124 opening in the forward end thereof.

A coil spring 122 is mounted within an internal cavity 123 in said movable cylinder 114 and is compressed between caps 123' which have point contact with the rearward wall of said cylinder and the end face of the screw extension 113 to minimize rotational friction. Said screw extension is non-movable axially, beving designed merely to rotate with the lock core 110, and the spring 122 bearing thereagainst exerts substantial axial pressure on the cylinder 114. As hereinabove described, said cylinder is both rotatably- and axially-movably carried within the housing, and when said cylinder is not locked against rotation the pressure of the spring 122 thereagainst causes said cylinder to simultaneously turn and move axially rearwardly on said screw member 113 to the broken line position of FIG. 4. The spring 122 tends to force the cylinder 114 and the screw 113 apart but, due to the very flat helical or cam faces of the screw threading, preferably at least 45°, a rotational motion is produced.

As in the principal form of the invention, rigidly mounted on the rotatable gear shift shaft 10 is a sector 12 provided with an arcuate slot 13, and the aforementioned plunger 117 on the axially-movable cylinder 114 is movable with said cylinder into and out of a projecting position within said slot. When said plunger 117 is inserted into said sector slot 13 (as shown in broken lines) the gear shift control shaft 10 can be rocked through the shift positions "low," "neutral," "park," and "reverse," but it cannot be shifted into "drive."

Mounted immediately below the gear shift control lock 110 in the form of the invention illustrated in FIG. 4 is the ignition lock, including a rotatable core 126, tumbler elements 127, and key 128, said lock being suitably connected to the car's electrical system as is well known in the art. Formed on and projecting rearwardly from said rotatable lock core 126 is a shaft 128, and carried on the end of said shaft is an eccentric cam element 129. An upright pin 132 is vertically-movably mounted adjacent said cam element, said cam being designed to bear against an enlarged bottom member 133 on said pin, and mounted below said pin and yieldably urging the same upwardly is a coil spring 131.

When the car is in its normal operating condition the locking mechanism is in the full line position illustrated in FIG. 4. In this condition it will be noted that the upper end of the vertically-movable, spring-loaded pin 132 projects upwardly into the groove 124 formed in the cylinder 114 thereabove, thus locking said cylinder against rotation and with the plunger 117 retracted from the sector slot 13. With the locking mechanism in this condition the gear shift control shaft 10 can be rocked throughout the complete shift range, including "drive."

When he ignition key 128 is turned to the "off" position the cam 129 turns therewith and depresses the pin 132 against the pressure of the spring 131, as shown in broken lines. As said pin 132 moves downwardly the upper end thereof is retracted from the groove 124 in the cylinder 114, and said cylinder is free to rotate. As hereinabove mentioned, when said cylinder is not locked against rotation the rearward pressure of the spring 122 thereagainst causes said cylinder to turn and move axially rearwardly on the screw extension 113 to the broken line position illustrated. In the latter position the plunger 117 projects into the sector slot 13, and the gear shift control is locked out of "drive."

When it is desired to unlock the shift control for normal driving, the ignition key 128 is turned to rotate the cam 129 to a position permitting upward movement of the spring-loaded pin 132. However, when the cylinder 114 thereabove was previously rotated during the control-locking operation the groove 124 in said cylinder was also rotated away from its downwardly-facing position and is not in registration with said pin. In order to complete the unlocking operation the separate key 119 must be inserted into the upper lock core 110 and said core and screw extension 113 turned by means of said key, the cylinder 114 turning therewith until said cylinder groove 124 is again in a downwardly-facing position. At that point the spring-loaded pin 132 automatically moves upwardly to project into said groove to lock said cylinder against further rotation.

Continued turning movement of the core 110 and screw extension 113, by means of the key 119, then functions to draw said axially-movable cylinder 114 forwardly on said screw member, the pin 132 riding in the longitudinal cylinder slot 124 during said axial travel, until the cylinder reaches the full line position of FIG. 4. In this position the plunger 117 is fully retracted from the sector 12.

The operator may then grasp the lock elements 112 to prevent the core 110 and screw member 113 from turning the opposite way under the tension of the spring 122 as he withdraws the key 119, and when said key is removed the tumbler elements 118 function to retain said core and screw extension against rotation. The plunger 117 is thus locked in its retracted position, and the car can be operated in its normal manner, including the use of the "drive" gear. As will be appreciated, one of the unique features of said "fail safe" locking mechanism is that the key 119 must be removed from the lock 110 in order to prevent the lock from automatically again assuming its locking condition. Furthermore, if lock 110 is forced by breaking pins 118 or if it is drilled out or otherwise made inoperative, then cylinder 110 becomes free to rotate as urged by the spring 122, thereby driving plunger 117 into the locked position in slot 13 of sector 12.

As in the principal form of the invention, the modified shift locking unit illustrated in FIG. 4 can also be readily operatively associated with a vehicle's driving lights and directional signals to further deter theft. In this respect, a headlight switch and pair of direction signal switches can be suitably mounted within and adjacent the rearward wall of the housing 116 in a position to be engaged by the axially-movable cylinder 114 when the latter is in its rearward, broken line position. Thus, when the plunger 117 on said cylinder is projected into the sector 12 to lock the gear shift control out of "drive" the driving lights will be simultaneously locked out, and the directional signal lights actuated.

From the foregoing detailed description it will be seen that the present invention provides a novel locking means and shift arrangement for cars having either an automatic or manual shift assembly whereby the gear shift lever can be locked out of the "high" or "drive" position when the car is left in a parking station with the ignition key therein, thereby minimizing the possibility of theft. With said invention the gear lever can be shifted into "low" and "reverse," however, to enable the station attendant to move the car when necessary.

In addition to preventing shifting of the gear mechanism into "drive," as described, the novel locking means comprising the present invention can also be operatively connected to the car's direction signals as shown by the wires in FIG. 4 which correspond to the same wires in the wiring diagram of FIG. 2, so that all of said signals will be simultaneously actuated when the car is being moved, and said device can be connected to the car's head and taillight circuit shown in FIG. 2, as indicated by the wire numerals in FIG. 4, to prevent said driving lights from being turned on by an unauthorized user, thereby reducing the chance of theft.

It is to be understood that while several preferred embodiments of the present invention have been illustrated and hereinabove described, numerous additional modifications thereof will undoubtedly occur to those skilled in the art, and it is intended to include herein not only the illustrated forms of said invention but also any and all variations or modifications thereof as may come within the spirit of said invention, and within the scope of the following claims.

What I claim is:

1. A vehicle having an ignition lock and having manually operable shift control mechanism selectively movable from one operating position to another and including "low," "reverse" and "high" positions, having means including an additional lock in addition to the ignition lock so connected to the shift control mechanism as to prevent movement thereof to high position while allowing movement to reverse and low positions when said additional lock is in locking position, wherein the improvement comprises electrically operated means on the vehicle with an electrical circuit therefor, and means comprising a switching connection between said circuit and said additional lock for abnormally affecting the circuit to said electrically operated means whenever the vehicle is operated at a time when driving in "high" is prevented.

2. A vehicle as claimed in claim 1 in which said electrically operated means is an electric signal and in which the abnormal affect on the electrical circuit causes operation of said signal whenever the vehicle is operated at a time when driving in "high" is prevented.

3. A vehicle as claimed in claim 1 in which said electrically operated means is the driving lights of the vehicle and in which the abnormal affect on the electrical circuit prevents operation of said driving lights whenever the vehicle is operated at a time when driving in "high" is prevented.

4. A vehicle as claimed in claim 1 in which said electrically operated means is the directional signal lights of the vehicle and in which the abnormal affect on the electrical circuit causes operation of said signal lights whenever the vehicle is operated at a time when driving in "high" is prevented.

5. A vehicle as claimed in claim 1 in which said electrically operated means is the driving lights and the directional signal lights of the vehicle, and in which the abnormal affect on the electrical circuit prevents operation of said driving lights and causes operation of said directional signals whenever the vehicle is operated at a time when driving in "high" is prevented.

6. A vehicle having an ignition lock and having manually operable shift control mechanism selectively movable from one operating position to another and including "low," "reverse" and "high" positions, wherein the improvement comprises an additional lock in addition to and operably associated with the ignition lock, and including mechanism whereby turning of said ignition lock to an off position releases said additional lock, and also including mechanism for thereafter causing locking movement of the additional lock to a position to prevent movement of the shift control mechanism to "high" position while allowing movement to "reverse" and "low" positions.

7. A vehicle as claimed in claim 6 wherein said additional lock is adapted to be unlocked by means of a separate key removably insertable therein.

8. A vehicle as claimed in claim 7 wherein said separate key must be removed from said additional lock to complete the unlocking thereof.

9. A vehicle as claimed in claim 8, in which the additional lock has locking tumblers which maintain the additional lock in said unlocking position when the key is withdrawn, and in which the mechanism for causing locking movement of the additional lock is responsive to multilation of said tumblers for causing locking movement of said shift control mechanism.

10. A vehicle as claimed in claim 6 in which said additional lock has a core and wherein the mechanism for causing locking movement of the additional lock includes a rotatably and slidably mounted cylinder, there being a helical connection between said cylinder and the core of the lock, spring means between said cylinder and core normally urging the cylinder to a position where it is helically extended toward locking position, and the mechanism for releasing said additional lock including a withdrawable latch between said ignition lock and cylinder to allow rotation of the cylinder after the ignition lock has been turned to an off position.

References Cited

UNITED STATES PATENTS

| | | | |
|---|---|---|---|
| 1,827,732 | 10/1931 | Conlan | 70—239 |
| 2,890,581 | 6/1959 | Lewis | 70—248 |

MARVIN A. CHAMPION, *Primary Examiner.*

R. L. WOLFE, *Assistant Examiner.*